H. B. MOLESWORTH.
MOTOR DRIVEN ROAD VEHICLE.
APPLICATION FILED SEPT. 12, 1918.
1,404,631.
Patented Jan. 24, 1922.
2 SHEETS—SHEET 1.
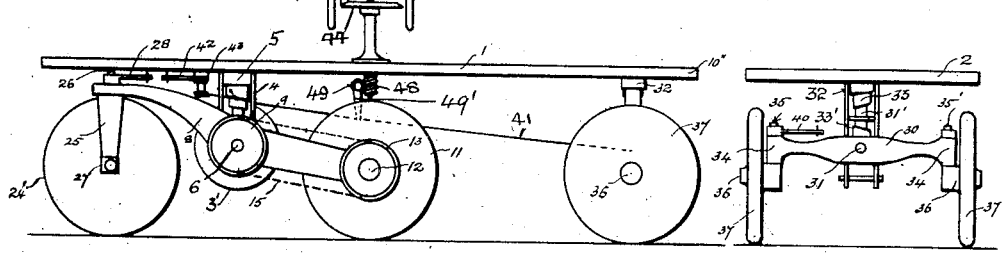
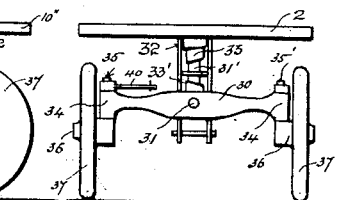
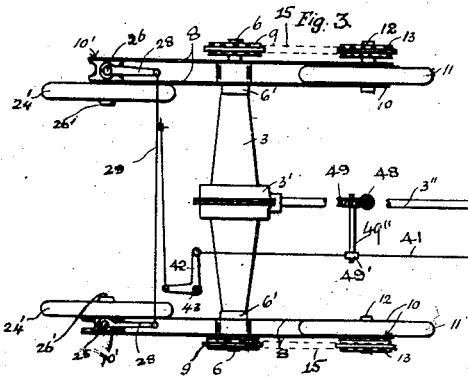
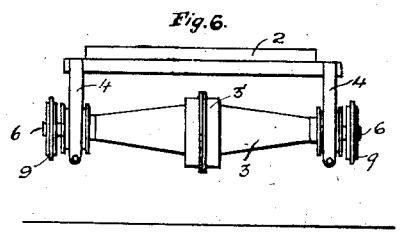
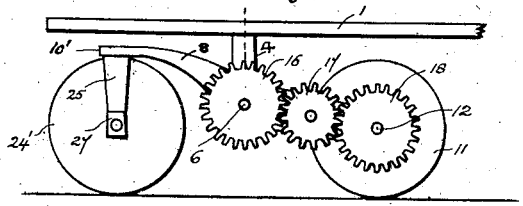
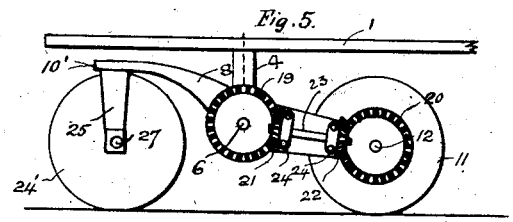
INVENTOR:
Henry Bridges Molesworth
By Wm Wallace White
ATTY.

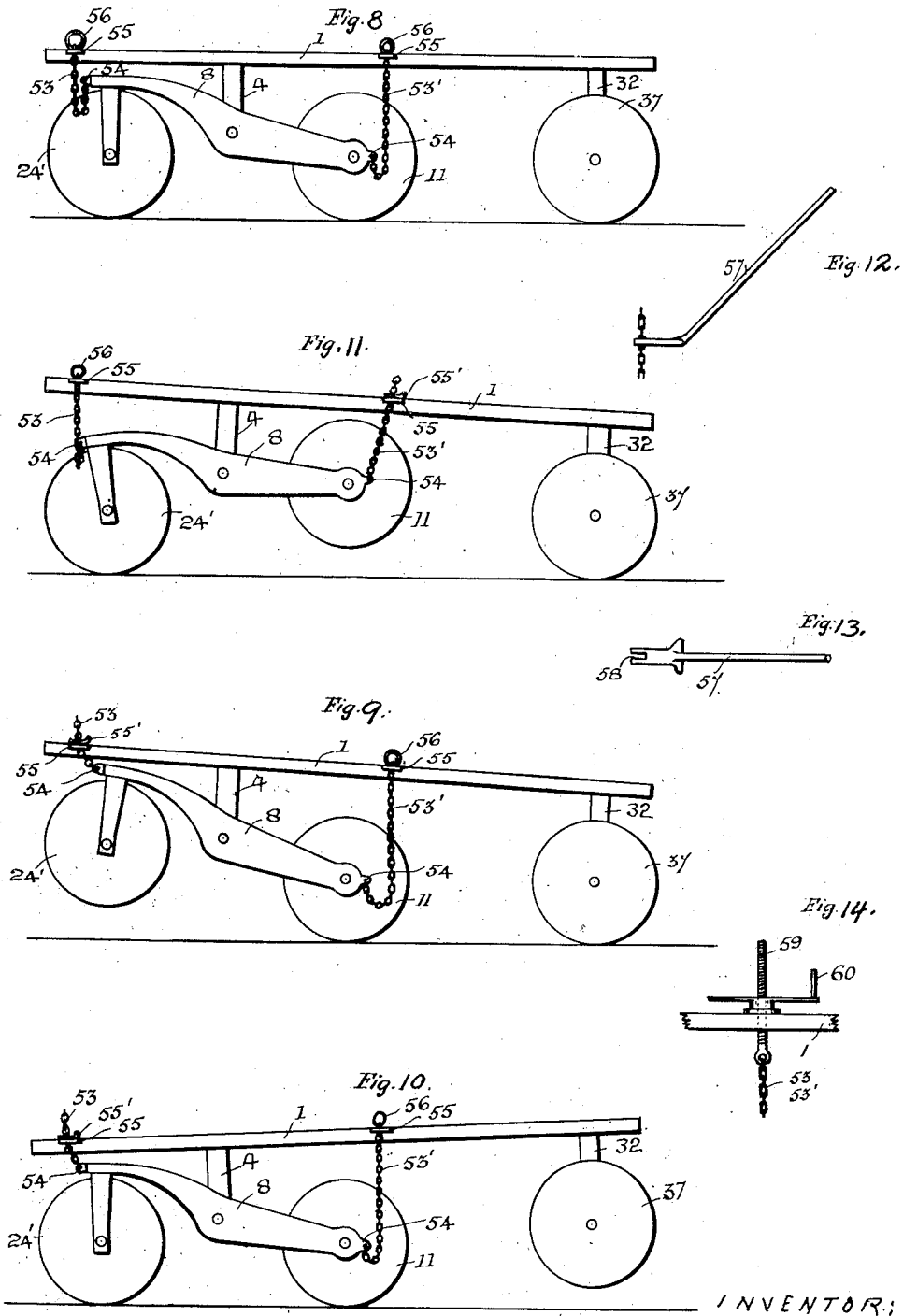

UNITED STATES PATENT OFFICE.

HENRY BRIDGES MOLESWORTH, OF BEXLEY, ENGLAND.

MOTOR-DRIVEN ROAD VEHICLE.

1,404,631. Specification of Letters Patent. Patented Jan. 24, 1922.

Application filed September 12, 1918. Serial No. 253,733.

*To all whom it may concern:*

Be it known that I, HENRY BRIDGES MOLESWORTH, a subject of the King of Great Britain, (whose post-office address is the Manor House, Bexley, Kent, England,) have invented new and useful Improvements in or Relating to Motor-Driven Road Vehicles.

In the specification relating to the British patent granted to me No. 3277 of the year 1907 there are set out and described means for steering motor road vehicles wherein an additional road wheel or wheels is or are provided at the rear or in front of the driving wheels, the additional wheel or wheels being linked to the usual front wheels of the vehicle in order that the additional wheel or wheels may co-act with such front wheels for the steering of the vehicle: and in the said specification is set out a method by which the additional wheel or wheels and the driving wheels are mounted on a compensating beam pivoted to the chassis frame in such a way that the load of the vehicle is distributed between the driving wheels and the additional wheel or wheels and whereby such additional wheel or wheels and the driving wheels may be tilted by inequalities in the ground over which the vehicle passes. According to my previous invention, the subject matter of the said patent, the driving wheels and the additional wheel or wheels and also the front wheels are respectively carried on the ends of axles in the usual way with the result that when one of a pair of wheels (being on the same axle) is raised or when it descends, due to inequalities in the ground, the other of the pair has necessarily also to move with its axle.

The main objects of my present invention are to so arrange the driving wheels and the additional steering wheels also employed in the present invention on compensating beams that, in conjunction with the front wheels (also carried by a compensating beam) the vehicle will be supported on three pivots and each compensating beam have movement independently of the others of such beams and consequently that the said driving wheels and the additional steering wheels shall move in a vertical or approximately vertical plane independently of each other and independently of the movement of the front wheels in such plane and to provide means for increasing the load on the driving wheels and to rapidly raise any one of the road wheels of the vehicle from the ground for the purpose of detachment and replacement or repair.

I attain the object of my improvements by the mechanism illustrated in the accompanying drawings in which:—

Fig. 1 is a side view of a part of a chassis arranged in accordance with my improvement embodying a chain drive.

Fig. 2 is a front end view of the same.

Fig. 3 is a plan view of the same.

Fig. 4 is a side view of part of chassis embodying a gear wheel drive.

Fig. 5 is a similar view showing a bevel wheel drive.

Fig. 6 is an end view of the chassis frame showing the differential axle and the chain wheels.

Fig. 7 is a view of the rear wheels.

Fig. 8 is a side view of part of chassis showing chains for raising wheels from the ground.

Figs. 9, 10 and 11 are similar views respectively showing a back wheel, a front wheel and a driving wheel lifted from the ground.

Fig. 12 is a side view of lever for operating the chains above referred to.

Fig. 13 is a plan view of the same, and

Fig. 14 illustrates screw gear which may alternatively be employed for operating the chains.

The same reference numerals denote the same parts throughout the several figures.

Referring to Figs. 1 to 3, 1 designates a side member of the chassis frame, 2 a cross member thereof, 3 the differential driving axle of the ordinary type, 4' the engine, 3' the differential gear casing, 3'' the propeller shaft, 4'' the gear box, 4''' the reverse and 5' the clutch. All such parts being well known and of ordinary description no explanation thereof is requisite. The differential axle may be secured to the chassis frame by means of springs in the usual way but I prefer to employ supports such as 4 and springs such as 5 for imparting flexibility to the differential axle. Rocking on the casing of the live axle 6 at 6' at each side of the chassis, preferably on bushes, are compensating beams 8. The ends 10 of the said beams carry driving wheels 11 rigid on short shafts 12 rotating in the ends 10 of such beams. Rigidly secured to the ends of the live axle and to the outer end of each of the short shafts 12 respectively are sprocket wheels 9 and 13, such sprocket wheels being joined by the chains 15. Instead however of employing sprocket wheels 9 and 13 and chains 15 motion from the live axle to the driving wheels 11 may be transmitted by means of gear wheels 16, 17, 18 as shown by Fig. 4, arranged at both sides of the vehicle, the wheel 17 rotating on a short shaft secured in the compensating beams 8, the wheels 16 being rigidly secured to the ends of the live axle and the wheels 18 rigidly to the short shafts 12: or instead of either the sprocket wheels 9 and 13 and chains 15 or the gear wheels 16, 17 and 18 for transmitting motion to the driving wheels I may employ at each side of the vehicle bevel wheels 19 and 20 meshing with bevel pinions 21 and 22 as will be readily understood on reference to Fig. 5, the said pinions 21 and 22 being fast on a shaft 23 rotating in bearings 24 secured to the compensating beams 8: or I may transmit motion to the driving wheels by suitable worm gearing. 24' are steering wheels each being carried at the ends 10' of the compensating beams 8 by supports 25 rigidly secured to the said beams. The supports 25 are bored each to receive rotatively a shaft 26, such shaft having at its lower end at 27 a short shaft 26' disposed at right angles to the shaft 26 on which shaft 26' the respective wheels 24' rotate. Each shaft 26 has rigidly secured thereto a crank 28 which cranks are connected together by the rod 29 so that the swinging of the wheels 24' may be in unison. 30 is a compensating beam or axle positioned at the end 10" of the chassis and is pivoted at 31 to a block furnished with the bar 31' having a vertical movement in the support 32, the block being channeled at its two sides to engage the members of and slide within the support 32 and be prevented from leaving it, the block moving against the influence of springs 33, 33'. The ends 34 of the axle are shaped as shown, such ends being bored to rotatably receive the shafts 35, 35', such shafts rigidly carrying short shafts 36 at right angles to the shafts 35, 35' on which the respective wheels 37 rotate. The shaft 35' is furnished with a crank 38 and the other shaft 35 with the bell crank 38' which cranks are pivotally connected by the rod 39 to ensure unison of swinging movement of the wheels 37. The limb 40 of the crank 38' is connected by means of a rod 41 to one limb of another bell-crank 42 moving on the pivot 43 secured to the chassis frame, the other limb of the said crank 42 being suitably connected preferably to the rod 29 tying the two cranks 28 together. By these means of linking the wheels 24' and 37 together it will be obvious that the said wheels are caused to move simultaneously for steering purposes.

The rod 41 is operated for the purpose of steering the vehicle, by means of a suitable steering head.

For the purpose of increasing the weight on the driving wheels and for lifting a wheel or wheels off the ground for repairs, I provide at or near the ends of the compensating beams a chain or equivalent which when not in operative use is sufficiently long as to permit the full movement of the compensating beams, which chains or the like are so arranged as to be drawn up—and slacked away—by any suitable means and which—when the chains or the like are drawn up—lift the ends of the beams and therewith the wheel or wheels at the raised end or ends thereof from the ground.

In Figs. 8 to 10 53, 53' are chains having fairly commodious links in order to accommodate a cotter pin 55' for the purpose as will hereinafter appear. One end of the chains is secured to the ends of the compensating beams at each side of the vehicle preferably by means of the eyes 54 formed at both ends of each of the said beams. The other end of the said chains is slidingly held to the side members of the chassis preferably by means of staples 55: or instead of staples slotted plates may be used or other means for the purpose may be employed. Each chain is provided with a ring 56 which serves the double purpose of preventing the chains leaving the chassis and providing means whereby such chains may be partially drawn through the staples or slotted plates. When the wheels of the vehicle are normal and on the ground the chains hang slack as shown in Fig. 8. When it is desired to concentrate or increase the weight of the load on the driving wheels 11 or to raise one of the wheels 24' from the ground for removal for repairs or other purposes one of the chains 53 near the wheel to be raised is pulled on and drawn through the staple 55 or slotted plate. When fully drawn up or drawn up to the desired extent the chain is retained in position by the slipping of a cotter pin 55' through a link in the chain as will be fully understood, the cotter pin bridging the staple or slotted plate, as shown by Fig. 9. The compensating beam or axle 30 may also be provided with chains at or near each end thereof, such chains being secured to the chassis frame as before described and each of the wheels 37 may be raised from the ground by means of such chains in the same manner: and the driving wheels 11 may each be raised from the ground by drawing up one of the chains 53' adjacent to the wheel to be raised and retaining such chain in position by means of the cotter pin as before described and as shown in Fig. 11. When it is desired to have both wheels 37 at one time raised from the ground as shown in Fig. 10 the chains 53 near wheels 24' are drawn up and that end of the vehicle near the wheels 24' is weighted so that the vehicle (which when the weights are equally distributed on the chassis will balance about the centre wheels) is tilted till the wheels 24' bear on the ground with sufficient force to ensure steering with such wheels. When it is desired to raise both wheels 24' from the ground as shown in Fig. 9, the procedure is the same except that that end of the vehicle near the wheels 37 is weighted sufficiently to permit steering with such wheels 37.

In Figs. 12 and 13 are shown by way of example simple and convenient means whereby the chains may be raised and lowered. Such means consist of the lever 57 shaped as shown and formed with the slot 58, the operation of which lever being clearly disclosed by Fig. 12. It will be understood that if the chains are drawn up by stages the cotter pins are inserted in the chain links to prevent the chain slipping back pending the re-engagement of the lever with other links of the chains to draw them up to the desired extent and similar operations are gone through in lowering the chains. The chains may be drawn up and slacked away by the means illustrated in Fig. 14 wherein such chains may be shackled to a screwed eye piece 59 passing freely through the chassis members 1 and engaging the screwed handle 60 as will be fully understood. The means shown in Fig. 14 are particularly applicable in those cases where other than chains are employed such as a wire cable for example.

As will be understood, in most cases the vehicle can proceed on its journey when one or even two wheels is or are disabled with such disabled wheel or wheels lifted off the ground as described above.

I claim:

1. A motor driven vehicle, comprising a chassis, a pair of compensating beams pivotally secured to said chassis and each carrying a road wheel at each end thereof whereby a pair of wheels is located at opposite sides of the pivots of said beams, and means for swinging said beams on their pivots to raise either pair of wheels from the ground, and a third pair of road wheels for supporting the chassis.

2. A motor driven vehicle, comprising a chassis, a pair of compensating beams pivotally secured to said chassis and each carrying a road wheel at each end thereof whereby a pair of wheels is located at opposite sides of the pivots of said beams, means for swinging said beams on their pivots to raise one pair of said wheels and either of the wheels of the other pair from the ground, and a third pair of road wheels for supporting the chassis.

3. A motor driven vehicle, comprising a chassis, a pair of compensating beams pivotally secured to said chassis and each carrying a road wheel at each end thereof whereby a pair of wheels is located at opposite sides of the pivots of said beams, means for swinging said beams on their pivots to raise either pair of wheels from the ground, and a third pair of road wheels for supporting the chassis, said third pair being pivotally and slidably movable relatively to the chassis.

4. A motor driven vehicle, comprising a chassis, a pair of compensating beams pivotally secured to said chassis and each carrying a road wheel at each end thereof whereby a pair of wheels is located at opposite sides of the pivots of said beams, means for swinging said beams on their pivots in one direction to raise one pair of wheels from the ground, and means for swinging the beams on their pivots in the other direction for raising the other pair of wheels from the ground, and a third pair of road wheels for supporting the chassis.

5. A motor driven vehicle, comprising a chassis, a pair of compensating beams pivotally secured to said chassis and each carrying a road wheel at each end thereof whereby a pair of wheels is located at opposite sides of the pivots of said beams, means for swinging said beams on their pivots in one direction to raise one pair of wheels from the ground, means for swinging the beams on their pivots in the other direction for raising the wheels of the other pair from the ground one independently of the other, and a third pair of road wheels for supporting the chassis.

6. A motor driven vehicle, comprising a chassis, a pair of compensating beams pivotally secured to said chassis and each carrying a road wheel at each end thereof whereby a pair of wheels is located at opposite sides of the pivots of said beams, means for swinging said beams on their pivots in one direction to raise one pair of wheels from the ground, means for swinging the beams on their pivots in the other direction for raising the wheels of the other pair from the ground one independently of the other, and a third pair of road wheels for supporting the chassis, said third pair being pivotally and slidably movable relatively to the chassis.

7. A motor driven vehicle, comprising a chassis, a pair of compensating beams pivotally secured to said chassis and each carrying a road wheel at each end thereof whereby a pair of wheels is located at opposite sides of the pivots of said beams, means for swinging said beams on their pivots in one direction to raise one pair of wheels from the ground, means for swinging the beams on their pivots in the other direction for raising the wheels of the other pair from the ground one independently of the other, a third compensating beam pivotally and slidably secured to said chassis and carrying a road wheel at each end thereof, and connecting means between said last wheel and one pair of the other wheels for steering movement together.

Dated 26th August, 1918.

HENRY BRIDGES MOLESWORTH.